(12) United States Patent
Ohta et al.

(10) Patent No.: US 10,530,015 B2
(45) Date of Patent: Jan. 7, 2020

(54) ALL-SOLID-STATE LITHIUM SECONDARY BATTERY AND METHOD FOR PRODUCING THE SAME

(75) Inventors: Shingo Ohta, Nagoya (JP); Mitsuru Asai, Nagakute (JP); Takahiko Asaoka, Nagoya (JP)

(73) Assignee: KABUSHIKI KAISHA TOYOTA CHUO KENKYUSHO, Nagakute-shi (JP)

(*) Notice: Subject to any disclaimer, the term of this patent is extended or adjusted under 35 U.S.C. 154(b) by 1630 days.

(21) Appl. No.: 14/127,825

(22) PCT Filed: Jun. 20, 2012

(86) PCT No.: PCT/JP2012/065756
§ 371 (c)(1),
(2), (4) Date: Dec. 19, 2013

(87) PCT Pub. No.: WO2012/176808
PCT Pub. Date: Dec. 27, 2012

(65) Prior Publication Data
US 2014/0162113 A1      Jun. 12, 2014

(30) Foreign Application Priority Data
Jun. 20, 2011 (JP) .................................. 2011-136509

(51) Int. Cl.
*H01M 10/0562* (2010.01)
*H01M 10/0585* (2010.01)
*H01M 10/04* (2006.01)

(52) U.S. Cl.
CPC ....... *H01M 10/0585* (2013.01); *H01M 10/04* (2013.01)

(58) Field of Classification Search
CPC ........... H01M 10/0562; H01M 4/0471; H01M 10/0585; H01M 10/04
See application file for complete search history.

(56) References Cited

U.S. PATENT DOCUMENTS

| 2004/0151986 A1 | 8/2004 | Park et al. |
| 2008/0241665 A1 | 10/2008 | Sane |
| (Continued) | | |

FOREIGN PATENT DOCUMENTS

| DE | 10 2007 030 604 A1 | 1/2009 |
| EP | 2 099 086 A1 | 3/2009 |
| (Continued) | | |

OTHER PUBLICATIONS

Halil Sahan et al. Improvement of the electrochemical performance of LiMn2O4 cathode active material by lithium borosilicate (LBS) surface coating for lithium-ion batteries, Journal of Alloys and Compounds 509 (2011) 4235-4241.*

(Continued)

*Primary Examiner* — Milton I Cano
*Assistant Examiner* — Jennifer A Moss
(74) *Attorney, Agent, or Firm* — Oliff PLC

(57) ABSTRACT

An all-solid-state lithium secondary battery includes a positive electrode; a negative electrode; and a solid electrolyte arranged between the positive and negative electrodes, to conduct lithium ions. In the all-solid-state lithium secondary battery, a mixed layer is in close contact with a surface of the solid electrolyte adjacent to the positive electrode, the mixed layer containing the positive-electrode active material and $(Li_{x(1-\alpha)}, M_{x\alpha/\beta})^{\gamma+}(B_{1-y}, A_y)^{z+}O^{2-}_{\delta}$ (wherein in the formula, M and A each represent at least one or more elements selected from C, Al, Si, Ga, Ge, In, and Sn, α satisfies 0≤α<1, β represents the valence of M, γ represents the average valence of $(Li^+_{x(1-\alpha)}, M_\alpha)$, y satisfies 0≤y<1, z represents the average valence of $(B_{1-y}, A_y)$ and x, α, β, γ, z, and γ satisfy the relational expression $(x(1-\alpha)+x\alpha/\beta)\gamma+z=2\delta)$ serving as a matrix.

6 Claims, 8 Drawing Sheets

(56) References Cited

U.S. PATENT DOCUMENTS

| | | |
|---|---|---|
| 2009/0081554 A1 | 3/2009 | Takada et al. |
| 2009/0226790 A1 | 9/2009 | Kanamura et al. |
| 2010/0047696 A1 | 2/2010 | Yoshida et al. |
| 2010/0203383 A1 | 8/2010 | Weppner |
| 2011/0027661 A1 | 2/2011 | Okazaki et al. |
| 2011/0244337 A1* | 10/2011 | Ohta .............. C04B 35/481 429/319 |
| 2014/0162113 A1 | 6/2014 | Ohta et al. |
| 2015/0024280 A1* | 1/2015 | Uchiyama ........ H01M 4/505 429/304 |

FOREIGN PATENT DOCUMENTS

| | | | |
|---|---|---|---|
| EP | 2 159 867 A1 | 3/2010 | |
| JP | A-06-044971 | 2/1994 | |
| JP | A-11-283664 | 10/1999 | |
| JP | A-2001-035495 | 2/2001 | |
| JP | A-2004-235155 | 8/2004 | |
| JP | A-2005-112710 | 4/2005 | |
| JP | A-2007-005279 | 1/2007 | |
| JP | A-2008-084798 | 4/2008 | |
| JP | A-2008-226639 | 9/2008 | |
| JP | A-2008-251225 | 10/2008 | |
| JP | A-2009-146739 | 7/2009 | |
| JP | A-2009-158476 | 7/2009 | |
| JP | A-2009-193940 | 8/2009 | |
| JP | A-2009-238739 | 10/2009 | |
| JP | A-2010-102929 | 5/2010 | |
| JP | A-2010-140725 | 6/2010 | |
| JP | WO 2010090301 A1 * | 8/2010 | ........... C04B 35/481 |
| JP | A-2010-192373 | 9/2010 | |
| JP | A-2010-202499 | 9/2010 | |
| JP | A-2010-272344 | 12/2010 | |
| JP | A-2011-051800 | 3/2011 | |
| JP | A-2011-129474 | 6/2011 | |
| JP | A-2013-032259 | 2/2013 | |
| WO | WO 2007/004590 A1 | 1/2007 | |
| WO | WO 2009/003695 A2 | 1/2009 | |
| WO | WO 2010/090301 A1 | 8/2010 | |

OTHER PUBLICATIONS

Murugan et al., "Fast Lithium Ion Conduction in Garnet-Type $Li_7La_3Zr_2O_{12}$," Angew. Chem. Int. 2007, vol. 46, pp. 7778-7781.

Awaka et al., "Synthesis and structure analysis of tetragonal $Li_7La_3Zr_2O_{12}$ with the garnet-related type structure," *Journal of Solid State Chemistry*, 182 (2009) pp. 2046-2052.

Thangadurai et al., " $Li_6ALa_2Nb_2O_{12}$(A=Ca, Sr, Ba): New Class of Fast Lithium Ion Conductors with Garnet-Like Structure," *Journal, J. Am. Ceram. Society*, 411-418 (2005), vol. 88, No. 2, pp. 411-418.

Aug. 18, 2011 International Preliminary Report on Patentability issued in International Application No. PCT/JP2010/051741.

Aug. 13, 2014 Office Action issued in U.S. Appl. No. 13/132,795.

May 15, 2012 Office Action issued in Japanese Patent Application No. 2010-014341 (with translation).

Feb. 26, 2013 Office Action issued in Japanese Patent Application No. 2009-122991 (with partial translation).

Apr. 26, 2010, International Search Report issue in International Application No. PCT/JP2010/051741.

Apr. 26, 2010 Written Opinion of the International Searching Authority in International Application No. PCT/JP2010/051741.

U.S. Appl. No. 14/464,202, filed Aug. 20, 2014 in the name of Ohta et al.

U.S. Appl. No. 13/132,795, filed Jun. 3, 2011 in the name of Ohta et al.

Kotobuki et al., "Compatibility of $Li_7La_3Zr_2O_{12}$ Solid Electrolyte to All-Solid-State Battery Using Li Metal Anode," *Journal of the Electrochemical Society*, Aug. 17, 2010, pp. A1076-A1079, vol. 157, No. 10, The Electrochemical Society.

Sep. 11, 2012 International Search Report issued in International Application No. PCT/JP2012/065756 (with translation).

\* cited by examiner (a)

(b)

ALL-SOLID-STATE LITHIUM SECONDARY BATTERY AND METHOD FOR PRODUCING THE SAME

TECHNICAL FIELD

The present invention relates to an all-solid-state lithium secondary battery and a method for producing the same.

BACKGROUND ART

Hitherto, all-solid-state lithium secondary batteries including solid electrolytes and active materials have been reported. Such a lithium secondary battery has a problem with lithium-ion conductivity at the solid-solid interface between a solid electrolyte and an active material, in some cases. For example, in the case where the solid electrolyte and the active material are bound together by the application of external pressure, a strong adhesion of bonded surfaces is not obtained, in some cases. In the case where sintering is performed at a high sintering temperature to increase the adhesion of an interface, the high temperature can lead to the degradation of the solid electrolyte and the active material and can lead to the formation of a third phase that increases the interface resistance between the solid electrolyte and the active material. Thus, for example, the lithium-ion conductivity between the solid electrolyte and the active material is inhibited, so that a sufficient energy density is not provided, in some cases.

To address the foregoing problems, for example, a technique has been reported as follows: An active material containing a first crystalline substance capable of intercalating and deintercalating lithium ions is bound to a solid electrolyte containing a second crystalline substance having lithium-ion conductivity. When analysis is performed by X-ray diffractometry, a component other than constituents of the active material layer and constituents of the solid electrolyte layer is not detected (for example, see PTL 1). A technique in which a sol-gel method is employed for the formation of an active material on a surface of a solid electrolyte has also been reported (see NPL 1). Furthermore, a technique in which a pulsed laser deposition (PLD) method, which is a gas-phase method, is employed has been reported (see PTL 2).

CITATION LIST

Patent Literature

PTL 1: JP 2007-5279 A
PTL 2: JP 2010-272344 A

Non Patent Literature

NPL 1: Journal of The Electrochemical Society, 157(10) A1076-1079 (2010)

SUMMARY OF INVENTION

Technical Problem

However, in the techniques described in PTL 1 and NPL 1, the discharge capacity is about 15 $\mu Ahcm^{-2}$, in other words, the energy density is not sufficient. Thus, further improvement is required. In the case where a gas-phase method is employed as in PTL 2, high lithium-ion conductivity is provided between a solid electrolyte and an active material. However, from the viewpoint of productivity and so forth, the energy density is required to be increased by a method other than the gas-phase method.

The present invention has been accomplished in light of the foregoing problems. It is a main object to provide an all-solid-state lithium secondary battery having a higher energy density and a method for producing the all-solid-state lithium secondary battery.

Solution to Problem

The inventors have conducted intensive studies in order to achieve the foregoing object and have found that regarding the formation of a positive-electrode active material on a surface of a solid electrolyte, in the case where a mixed layer is formed so as to be in close contact with a surface of the solid electrolyte, a higher energy density is provided, the mixed layer containing a positive-electrode active material and $(Li_{x(1-\alpha)}, M_{x\alpha/\beta})^{\gamma+}(B_{1-y}, A_y)^{z+}O^{2-}{}_\delta$ (wherein in the formula, M and A each represent at least one or more elements selected from C, Al, Si, Ga, Ge, In, and Sn, $\alpha$ satisfies $0 \le \alpha < 1$, $\beta$ represents the valence of M, $\gamma$ represents the average valence of $(Li^+_{x(1-\alpha)}, M_\alpha)$, y satisfies $0 \le y < 1$, z represents the average valence of $(B_{1-y}, A_y)$, and x, $\alpha$, $\beta$, $\gamma$, z, and $\delta$ satisfy the relational expression $(x(1-\alpha)+x\alpha/\beta)\gamma+z=2\delta$) serving as a matrix. This finding has led to the completion of the present invention.

That is, an all-solid-state lithium secondary battery of the present invention includes:

a positive electrode containing a positive-electrode active material;

a negative electrode containing a negative-electrode active material; and a solid electrolyte arranged between the positive electrode and the negative electrode, the solid electrolyte conducting lithium ions, wherein a mixed layer is in close contact with a surface of the solid electrolyte adjacent to the positive electrode, the mixed layer containing the positive-electrode active material and $(Li_{x(1+\alpha)}, M_{x\alpha/\beta})^{\gamma+}(B_{1-y}, A_y)^{z+}O^{2-}{}_\delta$ (wherein in the formula, M and A each represent at least one or more elements selected from C, Al, Si, Ga, Ge, In, and Sn, $\alpha$ satisfies $0 \le \alpha < 1$, $\beta$ represents the valence of M, $\gamma$ represents the average valence of $(Li^+_{x(1-\alpha)}, M_\alpha)$, y satisfies $0 \le y < 1$, z represents the average valence of $(\beta_{1-y}, A_y)$, and x, $\alpha$, $\beta$, $\gamma$, z, and $\delta$ satisfy the relational expression $(x(1-\alpha)+x\alpha/\beta)\gamma+z=2\delta$) serving as a matrix.

The all-solid-state lithium secondary battery has increased energy density. The reason why this effect is provided is not clear but is presumed as follows: When the matrix represented by $(Li_{x(1-\alpha)}, M_{x\alpha/\beta})^{\gamma+}(B_{1-y}, A_y)^{z+}O^{2-}{}_\delta$ is not present, the contact between particles of the positive-electrode active material and between the positive-electrode active material and the solid electrolyte is point contact. This is liable to cause a reduction in the number of lithium-ion-conducting paths. In contrast, in the all-solid-state lithium secondary battery of the present invention, the mixed layer containing the positive-electrode active material and the matrix is in close contact with the surface of the solid electrolyte adjacent to the positive electrode. Thus, the matrix serves as a lithium-ion-conducting path between the positive-electrode active material and the solid electrolyte, thereby increasing the proportion of the active material used. This results in an increase in the energy density. Note that the "matrix" indicates a material that fills gaps.

A production method according to the present invention includes:

a formation step of forming a raw-material layer on a surface of a solid electrolyte, the raw-material layer containing a positive-electrode active material and $(Li_{x(1-\alpha)}, M_{x\alpha/\beta})^{\gamma+}(B_{1-y}, A_y)^{z+}O^{2-}{}_\delta$ (wherein in the formula, M and A each represent at least one or more elements selected from C, Al, Si, Ga, Ge, In, and Sn, α satisfies 0≤α<1, β represents the valence of M, γ represents the average valence of $(Li^+{}_{(1-\alpha)}, M_\alpha)$, y satisfies 0≤y<1, z represents the average valence of $(B_{1-y}, A_y)$, and x, α, β, γ, z, and δ satisfy the relational expression (x(1−α)+xα/β)γ+z=2δ) serving as flux; and a heating step of heating the solid electrolyte on which the raw-material layer is formed at a temperature between a temperature equal to or higher than the melting point of the flux and a temperature equal to or lower than either a temperature at which the positive-electrode active material reacts with the flux to form a compound or a temperature at which the solid electrolyte reacts with the flux to form a compound, whichever is lower.

According to the production method, it is possible to further increase the energy density of an all-solid-state lithium secondary battery without employing a gas-phase method. The reason why this effect is provided is not clear but is presumed as follows: For example, $Li_3BO_3$, which is one of $(Li_{x(1-\alpha)}, M_{x\alpha/\beta})^{\gamma+}(B_{1-y}, A_y)^{z+}O^{2-}{}_\delta$, has a relatively low melting point of 650° C. It is thus possible to melt $Li_3BO_3$ at a temperature at which the active material and the solid electrolyte are not degraded and do not react with $Li_3BO_3$. Furthermore, $Li_3BO_3$ is melted and then solidified at such a temperature, thereby bringing the mixed layer containing the active material and $Li_3BO_3$ into close contact with the solid electrolyte and inhibiting the degradation of the solid electrolyte and the active material and the formation of a third phase. This will result in further inhibition of a reduction in lithium-ion conductivity, thereby increasing the energy density. Note that the "flux" indicates a lithium-ion-conducting material which, when the lithium-ion-conducting material is melted and then at least partially solidified, fills gaps.

DESCRIPTION OF EMBODIMENTS

Figure 1:
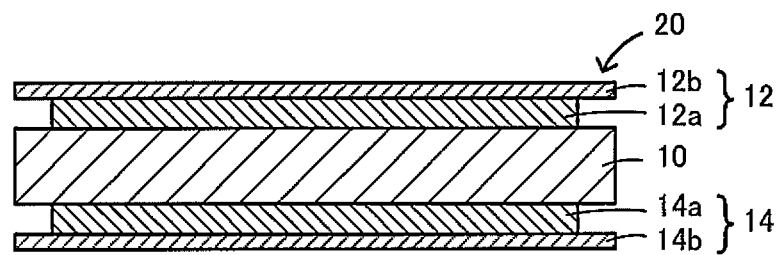
FIG. 1 is an explanatory drawing illustrating an example of a structure of an all-solid-state lithium secondary battery 20.

An all-solid-state lithium secondary battery of the present invention includes a positive electrode containing a positive-electrode active material, a negative electrode containing a negative-electrode active material, and a solid electrolyte arranged between the positive electrode and the negative electrode, the solid electrolyte conducting lithium ions, in which a mixed layer is in close contact with a surface of the solid electrolyte adjacent to the positive electrode, the mixed layer containing the positive-electrode active material and $(Li_{x(1-\alpha)}, M_{x\alpha/\beta})^{\gamma+}(B_{1-y}, A_y)^{z+}O^{2-}{}_\delta$ (wherein in the formula, M and A each represent at least one or more elements selected from C, Al, Si, Ga, Ge, In, and Sn, α satisfies 0≤α<1, β represents the valence of M, γ represents the average valence of $(Li^+{}_{x(1-\alpha)}, M_\alpha)$, y satisfies 0≤y<1, z represents the average valence of $(B_{1-y}, A_y)$, and x, α, β, γ, z, and δ satisfy the relational expression (x(1−α)+xα/β)γ+z=2δ) serving as a matrix.

The positive electrode has the positive-electrode active material. Examples of the positive-electrode active material that may be used include sulfides containing transition metal elements; and oxides containing lithium and transition metal elements. Specific examples of the positive-electrode active material that may be used include transition metal sulfides, such as $TiS_2$, $TiS_3$, $MoS_3$, and $FeS_2$; lithium-manganese composite oxides, such as $Li_{(1-x)}MnO_2$ (for example, 0<x<1, the same applies hereafter) and $Li_{(1-x)}Mn_2O_4$; lithium-cobalt composite oxides, such as $Li_{(1-x)}CoO_2$; lithium-nickel composite oxides, such as $Li_{(1-x)}NiO_2$; lithium-vanadium composite oxides, such as $LiV_2O_3$; and transition metal oxides, such as $V_2O_5$. Among them, lithium-transition metal composite oxides, such as $LiCoO_2$, $LiNiO_2$, $LiMnO_2$, and $LiV_2O_3$, are more preferred. Such oxide-based positive-electrode active materials are less likely to deform plastically. It is thus often difficult to increase adhesion to the solid electrolyte by external pressure. Therefore, the application of the present invention is of great significance for all-solid-state lithium secondary batteries including oxide-based positive-electrode active materials.

The negative electrode has the negative-electrode active material. Examples of the negative-electrode active material include inorganic compounds, such as lithium, lithium alloys, and tin compounds; carbonaceous materials capable of intercalating and deintercalating lithium ions; and conductive polymers. Among them, lithium alloys are preferred because the interfacial resistance between lithium alloys and the solid electrolyte is low. As the lithium alloys, lithium alloys each containing at least one or more additional elements selected from Mg, Al, Si, In, Ag, and Sn are more preferred. Al-containing lithium alloys and In-containing lithium alloys are more preferred. In particular, In-containing lithium alloys are preferred because even if the number of atoms added is small, the interfacial resistance between the solid electrolyte and the negative electrode is more reduced. In the negative electrode, the concentration of the additive element contained in the lithium alloy is preferably in the range of 10% by mass or more and 30% by mass or less, more preferably 15% by mass or more and 25% by mass or less, and still more preferably 20% by mass. When the concentration of the additive element contained is 10% by mass or more, the interfacial resistance is further reduced. At 30% by mass or less, the uniformity of the lithium alloy is further enhanced, which is preferred. The details of the lithium alloy used for the negative electrode are described in Japanese Unexamined Patent Application Publication No. 2011-70939 and thus are omitted here.

Each of the positive electrode and the negative electrode may have a collector. As the collector, aluminum, titanium, stainless steel, nickel, iron, baked carbon, conductive polymers, and conductive glass may be used. In addition, for the purpose of improving adhesiveness, conductivity, and oxidation resistance, a component composed of, for example, aluminum or copper having a surface treated with, for example, carbon, nickel, titanium, or silver may be used. They may be subjected to surface oxidation treatment. Examples of the shape of the collector include foil-like shapes, film-like shapes, sheet-like shapes, net-like shapes, punched or expanded shapes, lath shapes, porous shapes, foams, and fiber compacts.

As the solid electrolyte, lithium-ion-conducting oxides are preferred. Among them, garnet-type lithium-ion-conducting oxides are preferred. Garnet-type lithium-ion-conducting oxides may be represented by, for example, the general composition $Li_xA_3B_2O_{12}$ (wherein in the formula, A and B each represent at least one or more elements, and x represents a number to achieve the total charge balance). Among them, a garnet-type lithium-ion-conducting oxide represented by the general composition $Li_{5+x}La_3Zr_xA_{2-x}O_{12}$ (wherein in the formula, A represents at least one elements selected from the group consisting of Sc, Ti, V, Y, Nb, Hf, Ta, Al, Si, Ga, and Ge, and x satisfies 1.4≤x<2) is more preferred. Here, x satisfies 1.4≤x<2, so the conductivity is high and the activation energy is low, compared with a garnet-type oxide that does not contain element A, i.e., $Li_7La_3Zr_2O_{12}$ (that is, x=2). For example, when element A is Nb, the conductivity is $2.5 \times 10^{-4}$ Scm$^{-1}$ or more, and the activation energy is 0.34 eV or less. Thus, in the case where this oxide is used for an all-solid-state lithium secondary battery, lithium ions are easily conducted, thus improving the output of the battery. Furthermore, the activation energy is low, in other words, the rate of change in conductivity with temperature is low. This stabilizes the output of the battery. When x satisfies 1.6≤x≤1.95, the conductivity is higher and the activation energy is lower, which is preferred. When x satisfies 1.65≤x≤1.9, the conductivity is substantially maximized and the activation energy is substantially minimized, which is more preferred. The details of the garnet-type lithium-ion-conducting oxide represented by the general composition $Li_{5+x}La_3Zr_xA_{2-x}O_{12}$ are described in, for example, Japanese Unexamined Patent Application Publication No. 2010-202499 and thus are omitted here.

As the solid electrolyte, various inorganic solid electrolytes and organic solid electrolytes may be used in addition to those described above. Well-known examples of inorganic solid electrolytes include nitrides, halides, and oxyacid salts of Li. Specific examples thereof include $Li_4SiO_4$, $Li_4SiO_4$—LiI—LiOH, $xLi_3PO_4$—$(1-x)Li_4SiO_4$, $Li_2SiS_3$, $Li_3PO_4$—$Li_2S$—$SiS_2$, and phosphorus sulfide compounds. They may be used separately or in combination as a mixture of two or more. Examples of organic solid electrolytes include polyethylene oxide, polypropylene oxide, polyvinyl alcohol, polyvinylidene fluoride, polyphosphazene, polyethylene sulfide, and polyhexafluoropropylene, and derivatives thereof. They may be used separately or in combination as a mixture of two or more. Such oxide-based inorganic solid electrolytes are less likely to deform plastically. Thus, it is more often difficult to increase adhesion to the positive-electrode active material by external pressure. Therefore, the application of the present invention is of great significance for all-solid-state lithium secondary batteries including oxide-based inorganic solid electrolytes.

The mixed layer is in close contact with a surface of the solid electrolyte adjacent to the positive electrode. The term "close contact" used here indicates two-dimensional or three-dimensional contact (connection), rather than point contact. Whether the mixed layer is in close contact or not may be determined by whether the mixed layer is in point contact or not when a cross section is observed with, for example, a scanning electron microscope at a magnification of ×5000. The mixed layer contains the positive-electrode active material and $(Li_{x(1-\alpha)}, M_{x\alpha/\beta})^{\gamma+}(B_{1-y}, A_y)^{z+}O^{2+}{}_{\delta}$, serving as a matrix. In the formula, M and A each represent at least one or more elements selected from C, Al, Si, Ga, Ge, In, and Sn, α satisfies 0≤α<1, β represents the valence of M, γ represents the average valence of $(Li^+{}_{x(1-\alpha)}, M_\alpha)$, y satisfies 0≤y<1, z represents the average valence of $(B_{1-y}, A_y)$, and x, α, β, γ, z, and δ satisfy the relational expression $(x(1-\alpha)+x\alpha/\beta)\gamma+z=2\delta$. α and y preferably satisfy 0≤α≤0.5, and 0≤y≤0.5, and more preferably 0≤α≤0.3, and 0≤y≤0.3. The matrix may be composed of $Li_3BO_3$, in which M and A are not contained; $(Li_{x(1-\alpha)}, M_{x\alpha/\beta})^{\gamma+}B^{3+}O^{2-}{}_{\delta}$, in which Li is replaced with M, and B is not replaced with A; $Li^+{}_x(B_{1-y}, A_y)^{z+}O^{2-}{}_{\delta}$, in which B is replaced with A, and Li is not replaced with M; or a compound, in which Li is replaced with M, and B is replaced with A. In the case where Li is replaced with M and where B is replaced with A, M and A may be the same element or different elements. In $(Li_{x(1-\alpha)}, M_{x\alpha/\beta})_{\gamma+}(B_{1-y}, A_y)^{z+}O^{2-}{}_{\delta}$, M preferably represents an element with a coordination number of four, and A preferably represents an element with a coordination number of three. In $Li_3BO_3$, Li has a coordination number of four, and B has a coordination number of three. Thus, Li is easily replaced with an element having a coordination number of four, and B is easily replaced with an element having a coordination number of three. The ionic radius of M with a coordination number of four is preferably close to the ionic radius of $Li^+$ (four-coordination). The ionic radius of A with a coordination number of three is preferably close to the ionic radius of $B^{3+}$ (three-coordination). This is because in the case where the ionic radii are close to each other, it is possible to perform the replacement of the elements. For reference purposes, ionic radii of C, Al, Si, Ga, Ge, In, and Sn are described below. When each of the elements has a coordination number of four, the ionic radii are as follows: $C^{4+}$: 0.15 Å, $Al^{3+}$: 0.39 Å, $Si^{4+}$: 0.40 Å, $Ga^{3+}$: 0.47 Å, $Ge^{4+}$: 0.39 Å, $In^{3+}$: 0.62 Å, and $Sn^{4+}$: 0.55 Å. Note that $Li^+$ (four-coordination) has an ionic radius of 0.59 Å. When each of the elements has a coordination number of three, the ionic radii are as follows: C, 0.15 Å, $Al^{3+}$: 0.39 Å, $Si^{4+}$: 0.40 Å, $Ga^{3+}$: 0.47 Å, $Ge^{4+}$: 0.39 Å, $In^{3+}$: 0.62 Å, and $Sn^{4+}$: 0.55 Å. Note that $B^+$ (three-coordination) has an ionic radius of 0.15 Å. In $(Li_{x(1-\alpha)}, M_{x\alpha/\beta})^{\gamma+}(B_{1-y}, A_y)^{z+}O^{2-}{}_{\delta}$, M preferably has a higher valence than Li, and A preferably has a higher valence than B. This is because in the case where Li is replaced with M having a higher valence than Li, a defect is introduced into Li in order to balance the charge of the composition, thereby increasing the number of lithium-ion-conducting paths. Also in the case where B is replaced with A having a higher valence than B, a defect is introduced in order to balance the charge of the composition. In this case, the deficiency of Li, which has a higher vapor pressure than B, results in the introduction of a defect, thereby increasing the number of lithium-ion-conducting paths. From the viewpoints of the coordination number, the ionic radius, the valence, and so forth, M and A may each represent at least one or more selected from C, Al, Si, Ga, Ge, In, and Sn. At least one of M and A preferably is Al. This is because while the introduction of M and A increases the lithium-ion conductivity, in the case where at least one of M and A is Al, it is possible to further increase the lithium-ion conductivity. Furthermore, the increase in lithium-ion conductivity should lead to the effect of improving the output characteristics. In $(Li_{x(1-\alpha)}, M_{x\alpha/\beta})^{\gamma+}(B_{1-y}, A_y)^{z+}O^{2-}{}_\delta$, the stoichiometric composition may not be satisfied. Part of any of the elements may be deficient or in excess. Any of the elements may be partially replaced with another element. The mixed layer preferably has a structure in which particles of the positive-electrode active material are dispersed in the matrix. This is because in the case where $(Li_{x(1-\alpha)}, M_{x\alpha/\beta})^{\gamma+}(B_{1-y}, A_y)^{z+}O^{2-}{}_\delta$, which has lithium-ion conductivity, is present between the particles of the positive-electrode active material and between the particles of the positive-electrode active material and the solid electrolyte, the lithium-ion-conducting paths are more easily ensured between the particles of the positive-electrode active material and between the positive-electrode active material and the solid electrolyte. In particular, the matrix is more preferably a matrix (melt solidified) prepared by melting and then solidifying a matrix containing particles of the positive-electrode active material. This is because in the case where the matrix is one that has been melted into a liquid phase and then solidified, gaps between the positive-electrode active material and the solid electrolyte are filled with the matrix, so that the lithium-ion-conducting paths are more readily ensured.

In the solid electrolyte in close contact with the mixed layer (hereinafter, also referred to as a "composite"), preferably, no degradation of the positive-electrode active material or the solid electrolyte occurs, and no reaction product is formed. For example, when the positive-electrode active material and the solid electrolyte are subjected to XRD measurement with CuKα radiation, preferably, neither peak assigned to a reaction product of the positive-electrode active material and the matrix nor peak assigned to a reaction product of the solid electrolyte and the matrix is observed. It is also preferred that no peak assigned to a reaction product of the positive-electrode active material and the solid electrolyte be observed. The reason for this is that in such a case, the formation of a degraded layer and a third phase, which reduces the lithium-ion conductivity, is seemingly inhibited.

The shape of the all-solid-state lithium secondary battery of the present invention is not particularly limited. Examples thereof include coin shapes, button shapes, sheet shapes, laminate shapes, cylindrical shapes, flat shapes, and angular shapes. A plurality of such lithium secondary batteries may be connected in series and applied as a large-sized battery used for electric vehicles and so forth.

Figure 2:
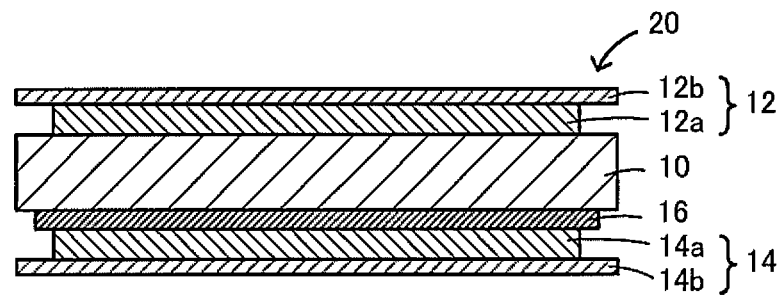
FIG. 2 is an explanatory drawing illustrating an example of a structure of the all-solid-state lithium secondary battery 20.

The structure of the all-solid-state lithium secondary battery of the present invention is not particularly limited. Examples thereof include structures illustrated in FIGS. 1 and 2. An all-solid-state lithium secondary battery 20 illustrated in FIG. 1 includes a solid electrolyte layer 10, a positive electrode 12 formed on one surface of the solid electrolyte layer 10, and a negative electrode 14 formed on the other surface of the solid electrolyte layer 10. The positive electrode 12 includes a mixed layer 12a (a layer containing a positive-electrode active material) in contact with the solid electrolyte layer 10 and a collector 12b in contact with the mixed layer 12a. The negative electrode 14 includes a negative-electrode active-material layer 14a (a layer containing a negative-electrode active material) in contact with the solid electrolyte layer 10 and a collector 14b in contact with the negative-electrode active-material layer 14a. Meanwhile, the all-solid-state lithium secondary battery 20 illustrated in FIG. 2 includes the solid electrolyte layer 10 composed of a garnet-type oxide, the positive electrode 12 formed on one surface of the solid electrolyte layer 10, the negative electrode 14 formed on the other surface of the solid electrolyte layer 10 with a polymer electrolyte layer 16 provided therebetween. The positive electrode 12 includes the mixed layer 12a and the collector 12b. The negative electrode 14 includes the negative-electrode active-material layer 14a and the collector 14b.

A method for producing an all-solid-state lithium secondary battery of the present invention will be described below. The method for producing an all-solid-state lithium secondary battery of the present invention includes (1) a formation step of forming a raw-material layer on a surface of a solid electrolyte, the raw-material layer containing a positive-electrode active material and $(Li_{x(1-\alpha)}, M_{x\alpha/\beta})^{\gamma+}(B_{1-y}, A_y)^{z+}O^{2-}{}_\delta$ (wherein in the formula, M and A each represent at least one or more elements selected from C, Al, Si, Ga., Ge, In, and Sn, α satisfies 0≤α<1, β represents the valence of M, γ represents the average valence of $(Li^+{}_{x(1-\alpha)}, M_\alpha)$, y satisfies 0≤y<1, z represents the average valence of $(B_{1-y}, A_y)$, and x, α, β, γ, z, and δ satisfy the relational expression (x(1−α)+xα/β)γ+z=2δ) serving as flux; and (2) a heating step of heating the solid electrolyte on which the raw-material layer is formed at a predetermined temperature.

(1) Formation Step

In the formation step, the raw-material layer containing the positive-electrode active material and the flux is formed on the surface of the solid electrolyte. The details of the positive-electrode active material are the same as those described above and thus are omitted. The flux is represented by $(Li_{x(1-\alpha)}, M_{x\alpha/\beta})^{\gamma+}(B_{1-y}, A_y)^{z+}O^{2-}{}_\delta$. In the figure, M and A each represent at least one or more elements selected from C, Al, Si, Ga, Ge, In, and Sn, α satisfies 0≤α<1, β represents the valence of M, γ represents the average valence of $(Li^+{}_{x(1+\alpha)}, M_\alpha)$, y satisfies 0≤y<1, z represents the average valence of $(B_{1-y}, A_y)$, x, α, β, γ, z, and δ satisfy the relational expression (x(1−α)+xα/β)γ+z=2δ. α and y preferably satisfy 0≤α≤0.5, and 0≤y≤0.5, and more preferably 0≤α≤0.3, and 0≤y≤0.3. The flux may be composed of $Li_3BO_3$, in which M and A are not contained; $(Li_{x(1-\alpha)}, M_{x\alpha/\beta})^{\gamma+}B^{3+}O^{2-}{}_\delta$, in which Li is replaced with M, and B is not replaced with A; $Li^+{}_x(B_{1-y}, A_y)^{z+}O^{2-}{}_\delta$, in which B is replaced with A, and Li is not replaced with M; or a compound, in which Li is replaced with M, and B is replaced with A. In the case where Li is replaced with M and where B is replaced with A, M and A may be the same element or different elements. In $(Li_{x(1-\alpha)}, M_{x\alpha/\beta})^{\gamma+}(B_{1-y}, A_y)^{z+}O^{2-}{}_\delta$, M preferably represents an element with a coordination number of four. A preferably represents an element with a coordination number of three. In $Li_3BO_3$, Li has a coordination number of four, and B has a coordination number of three. Thus, Li is easily replaced with an element having a coordination number of four, and B is easily replaced with an element having a coordination number of three. The ionic radius of M with a coordination number of four is preferably close to the ionic radius of $Li^+$ (four-coordination). The ionic radius of A with a coordination number of three is preferably close to the ionic radius of $B^{3+}$ (three-coordination). This is because in the case where the ionic radii are close to each other, it is probably possible to perform the replacement of the elements. In $(Li_{x(1-\alpha)}, M_{x\alpha/\beta})^{\gamma+}(B_{1-y}, A_y)^{z+}O^{2-}{}_\delta$, M preferably has a higher valence than Li, and A preferably has a higher valence than B. This is because in the case where Li is replaced with M having a higher valence than Li, a defect is introduced into Li in order to balance the charge of the composition, thereby increasing the number of lithium-ion-conducting paths. Also in the case where B is replaced with A having a higher valence than B, a defect is introduced in order to balance the charge of the composition. In this case, the deficiency of Li, which has a higher vapor pressure than B, results in the introduction of a defect, thereby increasing the number of lithium-ion-conducting paths. From the viewpoints of the coordination number, the ionic radius, the valence, and so forth, M and A may each represent at least one or more selected from C, Al, Si, Ga, Ge, In, and Sn. At least one of M and A preferably is Al. This is because while the introduction of M and A increases the lithium-ion conductivity, in the case where at least one of M and A is Al, it is possible to further increase the lithium-ion conductivity. Furthermore, the increase in the lithium-ion conductivity should lead to the effect of improving the output characteristics. In $(Li_{x(1-\alpha)}, M_{x\alpha/\beta})^{y+}(B_{1-y}, A_y)^{z+}O^{2-}{}_\delta$, the stoichiometric composition may not be satisfied. Part of any of the elements may be deficient or in excess. Any of the elements may be partially replaced with another element. At least the flux itself is melted in the subsequent heating step. Then at least part of the flux solidifies into the matrix and comes into close contact with the surface of the solid electrolyte as the mixed layer together with the positive-electrode active material. The flux may have the function of lowering the melting points of the positive-electrode active material and the solid electrolyte and allowing them to melt easily. The reason for this is that in the case of the flux, the positive-electrode active material is also melted and then solidified during the melting and the subsequent solidification of the flux, thereby increasing an interface surface in which the positive-electrode active material and the solid electrolyte are in direct contact with each other. The flux may have a function as a sintering aid. The reason for this is that in the case of the flux, sinterability between the positive-electrode active material particles and between the positive-electrode active material and the solid electrolyte is increased, thereby increasing the lithium-ion conductivity.

With respect to the formation of the raw-material layer, a mixture of the positive-electrode active material and the flux may be formed into a layer. A layer composed of the flux may be formed after the formation of a layer composed of the positive-electrode active material. A layer composed of the positive-electrode active material may be formed after the formation of a layer composed of the flux. Layers composed of the positive-electrode active material and layers composed of the flux may be alternately formed. As described above, both of them are not necessarily required to be uniformly mixed together as long as the raw-material layer contains the positive-electrode active material and the flux as a whole.

In the formation of the raw-material layer, a paste (hereinafter, also referred to as a "raw-material paste") prepared by adding, for example, a binder to the positive-electrode active material and the flux may be used. Examples of the binder that may be used include cellulose-based binders composed of, for example, ethylcellulose, methylcellulose, or carboxymethyl cellulose; and various binders composed of butyral-based resins and acrylic-based resins. An organic solvent, for example, terpineol, acetone, or toluene, may be used as a solvent. The raw-material paste may be prepared by mixing the positive-electrode active material, the flux, the binder, the solvent, and so forth using a common method for producing a paste with, for example, a tri-roll mill or a pot mill. As a method for forming a layer composed of the raw-material paste on the solid electrolyte, known liquid-feeding techniques, such as dispensers, dipping, and spray, and printing techniques, such as a doctor blade method, screen printing, and metal mask printing, may be employed. Among them, screen printing is preferred because the thickness and the pattern can be controlled with high precision. In the case of metal mask printing, the raw-material paste is easily formed into a thick layer, thus facilitating the control of the shape.

(2) Heating Step

In the heating step, the solid electrolyte on which the raw-material layer is formed is heated at a temperature between a temperature equal to or higher than the melting point of the flux and a temperature equal to or lower than either a temperature at which the positive-electrode active material reacts with the flux to form a compound or a temperature at which the solid electrolyte reacts with the flux to form a compound, whichever is lower. In this way, heating is performed at a temperature equal to or higher than the melting point of the flux, so that the flux is in a liquid-phase state, thereby increasing the adhesion of the flux to the solid electrolyte. Furthermore, heating is performed at the temperature equal to or lower than either the temperature at which the positive-electrode active material reacts with the flux to form a compound or the temperature at which the solid electrolyte reacts with the flux to form a compound, whichever is lower. Thus, a reaction product between the flux and either the positive-electrode active material or the solid electrolyte is not formed. This inhibits the formation of a third phase that reduces the lithium-ion conductivity. Furthermore, the heating temperature is preferably a temperature lower than the temperature at which the positive-electrode active material reacts with the solid electrolyte. Moreover, the heating temperature is preferably a temperature at which no degradation of the positive-electrode active material or the solid electrolyte occurs. This further inhibits the formation of the third phase and a degraded layer that reduces the lithium-ion conductivity. The temperature at which no degradation of the positive-electrode active material or the solid electrolyte occurs may be determined on the basis of a treatment temperature in the synthesis of the positive-electrode active material or the solid electrolyte. The reason for this is presumably that degradation is less likely to occur at a temperature lower than the treatment temperature in the synthesis. Specifically, the heating temperature is preferably higher than 600° C. and 900° C. or lower, more preferably 650° C. or higher and 800° C. or lower, and still more preferably 700° C. or higher and 750° C. or lower. An atmosphere during heating is not particularly limited. An air atmosphere or oxidizing atmosphere is preferred. The reason for this is as follows: In such an atmosphere, the elimination of oxygen from the structure of $Li_3BO_3$ is inhibited. In the case where the positive-electrode active material and the solid electrolyte are oxides, the elimination of the oxygen from the positive-electrode active material and the solid electrolyte is inhibited. Thus, the flux, the positive-electrode active material, and the solid electrolyte are not easily degraded. Furthermore, a reaction product is not easily formed.

By the method for producing an all-solid-state lithium secondary battery, it is possible to produce the all-solid-state lithium secondary battery including the mixed layer in close contact with the surface of the solid electrolyte adjacent to the positive electrode, the mixed layer containing the positive-electrode active material and $(Li_{x(1-\alpha)}, M_{x\alpha/\beta})^{y+}(B_{1-y}, A_y)^{z+}O^{2-}{}_\delta$ (wherein in the formula, M and A each represent at least one or more elements selected from C, Al, Si, Ga, Ge, In, and Sn, a satisfies 0≤α<1, β represents the valence of M, γ represents the average valence of $(Li^+_{x(1-\alpha)}, M_\alpha)$, y satisfies 0≤y<1, z represents the average valence of $(B_{1-y}, A_y)$, and x, α, β, γ, z, and δ satisfy the relational expression (x(1−α)+xα/β)γ+z=2δ) serving as the matrix. It is thus possible to further increase the energy density of the all-solid-state lithium secondary battery without employing a gas-phase method.

The present invention is not limited to the foregoing embodiments. It is obvious that various embodiments may be made without departing from the technical scope of the present invention.

EXAMPLES

Hereinafter, specific examples of the production of the all-solid-state lithium secondary battery of the present invention are described as Examples.

Example 1

(1) Preparation of Solid Electrolyte $Li_2CO_3$, $La(OH)_3$, $ZrO_2$, and $Nb_2O_5$ were used as starting materials. The starting materials were weighed in such a manner that the stoichiometric ratio of the general composition $Li_{6.75}La_3Zr_{1.75}Nb_{0.25}O_{12}$ (hereinafter, also referred to as "LLZONb") was achieved. The starting materials were mixed and pulverized for 4 hours in ethanol with a planetary ball mill (300 rpm, zirconia balls). The mixed powder of the starting materials (inorganic materials) was separated from the zirconia balls and ethanol and then calcined in an $Al_2O_3$ crucible at 950° C. for 10 hours in an air atmosphere. Next, in order to compensate the deficiency of Li in firing, $Li_2CO_3$ was added to the calcined powder in such a manner that the amount of Li added was 5 at % with respect to the amount of Li in the inorganic materials. To pulverize and mix the calcined powder, the calcined powder was pulverized and mixed in ethanol with a planetary ball mill (300 rpm, zirconia balls) for 6 hours. The resulting powder was calcined again under atmospheric pressure at 950° C. for 5 hours. Subsequently, the resulting powder was formed into a piece having a diameter of 13 mm and a thickness of 2 mm, subjected to cold isostatic pressing (CIP), and fired at 1150° C. for 36 hours in air to form a pellet-like solid electrolyte. CIP was performed at 27° C. and 200 MPa with water as a solvent.

(2) Preparation of Positive-Electrode Active-Material Paste $Li_2CO_3$ and CoO were used as starting materials. The starting materials were weighed in such a manner that the molar ratio of $Li_2CO_3$ to CoO was 1:2 (a total weight of about 50 g). The starting materials were mixed and pulverized for 1 hour in ethanol (100 ml) with a planetary ball mill (300 rpm, zirconia pod (500 cc), zirconia beads (3 mm in diameter, 500 g)). After desolvation was performed in a dryer set at 80° C., the raw-material mixed powder was separated from the zirconia beads with a sieve. The resulting powder was heat-treated in an alumina crucible at 850° C. for 20 hours in air to synthesize a $LiCoO_2$ powder. Then 20 g of the resulting $LiCoO_2$ powder and 12 g of a binder (EC Vehicle (a mixture of ethylcellulose and terpionel), manufactured by Nisshin Kasei Co., Ltd.) were mixed together to prepare a positive-electrode active-material paste.

(3) Preparation of Flux Paste $Li_2CO_3$ and $B_2O_3$ were used as starting materials. The starting materials were weighed in such a manner that the molar ratio of $Li_2CO_3$ to $B_2O_3$ was 1:1 (a total weight of about 50 g). The starting materials were mixed and pulverized for 1 hour in ethanol (100 ml) with a planetary ball mill (300 rpm, zirconia pod (500 cc), zirconia beads (3 mm in diameter, 500 g)). After desolvation was performed in a dryer set at 80° C., the raw-material mixed powder was separated from the zirconia beads with a sieve. The resulting powder was heat-treated in an alumina crucible at 600° C. for 12 hours in air to synthesize a $Li_3BO_3$ powder. Then 20 g of the resulting $Li_3BO_3$ powder and 14 g of a binder (EC Vehicle, manufactured by Nisshin Kasei Co., Ltd.) were mixed to prepare a flux paste.

(4) Production of Battery

A surface of the resulting pellet-like solid electrolyte was polished with sandpaper (#6000). The flux paste was applied to the polished surface by screen printing. In this case, the screen had a size of 10 mm in diameter. Desolvation was performed in a dryer set at 150° C. over a period of about 10 minutes. After the desolvation, the flux paste weighed about 1.8 mg. The positive-electrode active-material paste was applied to $Li_3BO_3$ with a screen having a diameter of 10 mm and subjected to desolvation in the dryer set at 150° C. over a period of about 10 minutes. After the desolvation, the positive-electrode active-material paste weighed about 1.8 mg. The resulting article was baked in air at 750° C. for 1 hour to produce a composite. $Li_3BO_3$ was melted into a liquid phase during the baking to form a $LiCoO_2$—$Li_3BO_3$ mixed layer as a raw-material layer. A surface of the resulting mixed layer of the composite was coated with Au, serving as a collector, by sputtering. In a glove box filled with Ar, LiIn (In: 20% by mass), serving as a negative electrode, was pressed on a surface of the solid electrolyte opposite the surface on which the positive electrode (mixed layer) was baked, thereby forming the negative electrode. The resulting battery was placed in a hermetically sealed vessel. Insulated lead wires were taken from the vessel and defined as collectors.

(5) XRD Measurement

The resulting composite was subjected to XRD measurement. The XRD measurement was performed with TTR, manufactured by Rigaku Corporation, under conditions: radiation source: CuKα radiation, 1 step=0.02° per second, 2θ=10° to 80°.

(6) SEM Observation

SEM observation was performed on the resulting composite. The SEM observation was performed with a scanning electron microscope (S-3400N, manufactured by Hitachi High-Technologies Corporation).

(7) Charge-Discharge Test

Experiments described below were performed in a constant temperature oven set at 25° C.

(A) Constant-Voltage Charge and Discharge

Constant-voltage charge and discharge were performed under conditions described below.

Rate: 0.1 mV/sec, scanning potential: 2.5 to 4.2 V (vs. $Li^+$/Li)

(B) Constant-Current Charge and Discharge

Constant-current charge and discharge were performed under conditions described below.

Current: 2.5 μcm$^{-2}$, scanning potential: 2.5 to 4.2 V (vs. $Li^+$/Li)

Examples 2 to 4

A battery of Example 2 was produced in the same process as in Example 1, except that baking was performed at 700° C. A battery of Example 3 was produced in the same process as in Example 1, except that baking was performed at 800°

C. A battery of Example 4 was produced in the same process as in Example 1, except that baking was performed at 900° C.

Example 5

A battery of Example 5 was produced in the same process as in Example 1, except that the following "(3') Preparation of flux paste" was performed in place of the foregoing "(3) Preparation of flux paste".

Figure 3:
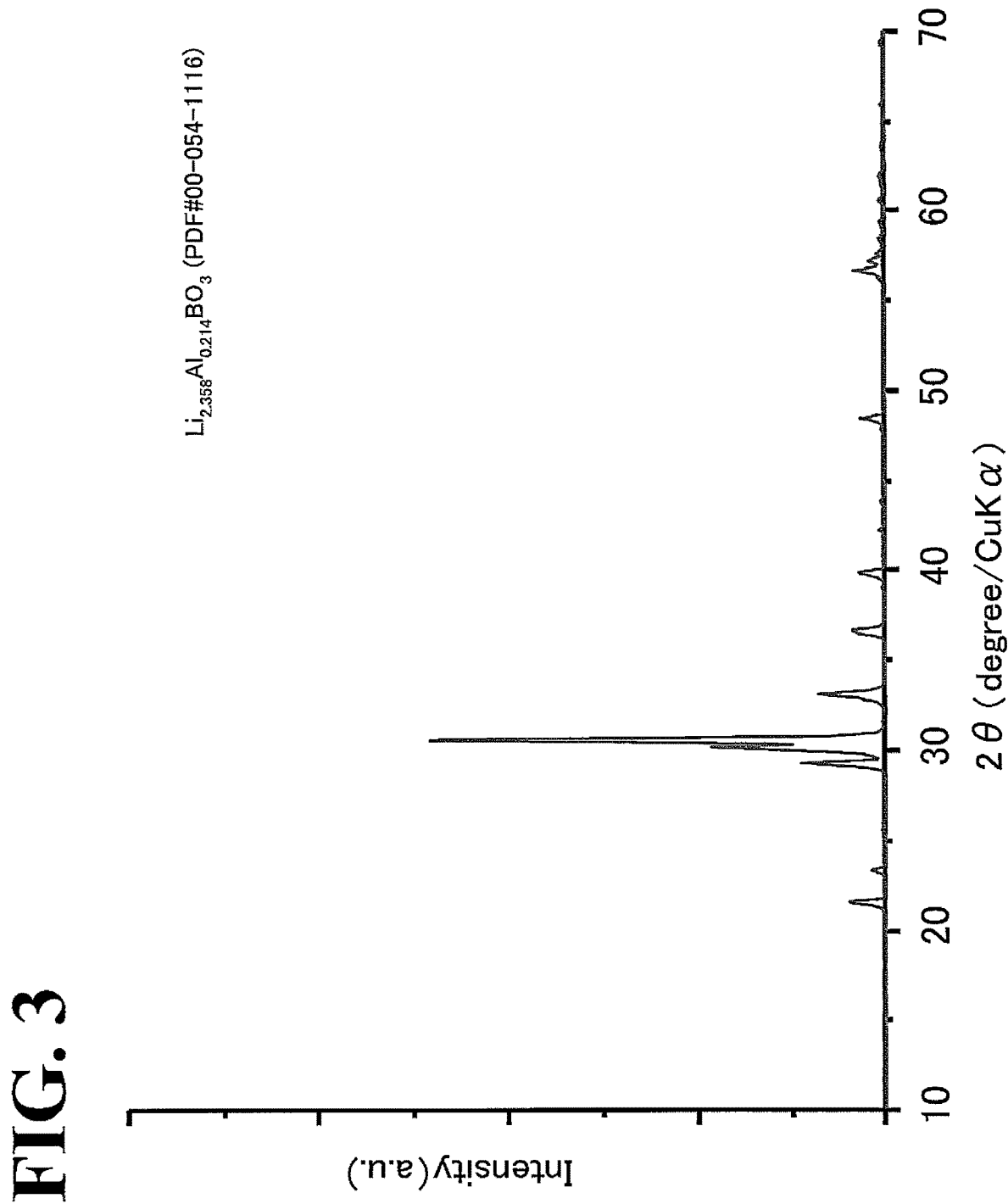
FIG. 3 illustrates an XRD pattern of a powder used as flux in Example 5.

(3') Preparation of Flux Paste $Li_2CO_3$, $B_2O_3$, and $\gamma Al_2O_3$ were used as starting materials. The starting materials were weighed in such a manner that the molar ratio of $Li_2CO_3$ to $B_2O_3$ to $\gamma Al_2O_3$ was 2.358:1:0.107 (a total weight of about 50 g). The starting materials were mixed and pulverized for 1 hour in ethanol (100 ml) with a planetary ball mill (300 rpm, zirconia pod (500 cc), zirconia beads (3 mm in diameter, 500 g)). After desolvation was performed in a dryer set at 80° C., the raw-material mixed powder was separated from the zirconia beads with a sieve. The resulting powder was heat-treated in an alumina crucible at 600° C. for 12 hours in air to synthesize a powder. The resulting powder was subjected to XRD measurement with TTR, manufactured by Rigaku Corporation, under conditions: radiation source: CuKα radiation, 1 step=0.02° per second, 2θ=10° to 70°. FIG. 3 illustrates an XRD pattern of the powder. The resulting XRD pattern was matched to PDF #00-054-1116; hence, the powder was identified as $Li_{2.358}Al_{0.214}BO_3$. Then 20 g of the resulting $Li_{2.358}Al_{0.214}BO_3$ powder and 14 g of a binder (EC Vehicle, manufactured by Nisshin Kasei Co., Ltd.) were mixed to prepare a flux paste. Al tends to have a coordination number of four. Thus, in Example 5, Li was seemingly replaced with mainly Al.

Comparative Example 1

A battery of Comparative Example 1 was produced in the same process as in Example 1, except that baking was performed at 600° C.

Comparative Examples 2 and 3

A battery of Comparative Example 2 was produced in the same process as in Example 1, except that $B_2O_3$ was used as the flux and that baking was performed at 900° C. A battery of Comparative Example 3 was produced in the same process as in Example 1, except that $Li_2B_4O_7$ was used as the flux and that baking was performed at 900° C.

Comparative Examples 4 to 6

A battery of Comparative Example 4 was produced in the same process as in Example 1, except that $Bi_2O_3$ was used as the flux and that baking was performed at 900° C. A battery of Comparative Example 5 was produced in the same process as in Example 1, except that $WO_3$ was used as the flux and that baking was performed at 900° C. A battery of Comparative Example 6 was produced in the same process as in Example 1, except that $Li_2WO_4$ was used as the flux and that baking was performed at 950° C.

Comparative Example 7

A battery of Comparative Example 7 was produced in the same process as in Example 1, except that no flux was used and that baking was performed at 850° C.

Comparative Example 8

A battery of Comparative Example 8 was produced by bringing a positive-electrode active material ($LiCoO_2$) into close contact with the solid electrolyte using a PLD method, the solid electrolyte being prepared by the method described in Example 1. In the PLD method, a Nd-YAG laser (λ=266 nm, E=up to 1 $Jcm^{-2}$ $pls^{-1}$) was used. During deposition, the oxygen pressure $P_{o2}$ in a chamber was 10 Pa, and the temperature was normal temperature. The resulting positive-electrode active-material layer had a diameter of 6 mm and a thickness of 4 μm. A pellet including the positive-electrode-active material layer was subjected to annealing treatment in an electric furnace at 500° C. for 1 hour (air atmosphere). A Au paste was applied to the positive-electrode-active material layer. Then a Au metal plate, serving as a collector for the positive electrode, was baked at 400° C. for 30 minutes. The positive-electrode-active material layer, the Au metal plate, and the Au paste correspond to the positive electrode. Next, the pellet including the positive electrode was placed in a glove box (Ar atmosphere). A negative electrode composed of LiIn (In: 20% by mass) was pressed on a surface to which the positive electrode was not attached, thereby producing the battery of Comparative Example 8.

Reference Examples 1 to 3

A composite of Reference Example 1 was produced in the same process as in Example 1, except that LLZONb was used in place of $LiCoO_2$ and that baking was performed at 900° C. A composite of Reference Example 2 was produced in the same process as in Reference Example 1, except that $Li_2MoO_4$ was used as the flux and that baking was performed at 750° C. A composite of Reference Example 3 was produced in the same process as in Reference Example 1, except that $Li_2WO_4$ was used as the flux and that baking was performed at 850° C.

Reference Example 4

An $Al_2O_3$ substrate was prepared. A surface thereof was polished with sandpaper (#6000). The flux paste prepared in "(3) Preparation of flux paste" of Example 1 was applied to the polished surface by screen printing. In this case, the screen had a size of 10 mm in diameter. Desolvation was performed in a dryer set at 150° C. over a period of about 10 minutes. After the desolvation, the flux paste weighed about 1.8 mg. The resulting article was baked in air at 700° C. for 1 hour to produce a composite. The resulting composite was subjected to XRD measurement. The XRD measurement was performed with TTR, manufactured by Rigaku Corporation, under conditions: radiation source: CuKα radiation, 1 step=0.02° per second, 2θ=10° to 90°.

Reference Example 5

Pellet-like samples composed of $Li_7La_3Zr_2O_{12}$, $Li_{6.75}Zr_{1.75}Nb_{0.25}O_{12}$, $Li_5La_3Nb_2O_{12}$, LiPON, $Li_3PO_4$, $Li_2CO_3$, $Li_3BO_3$, and $Li_{2.358}Al_{0.214}BO_3$ were produced. The lithium-ion conductivity thereof was measured at room temperature. The measurement of the lithium-ion conductivity was performed as follows: Au electrodes were formed on each of the resulting samples with an ion coater. The lithium-ion conductivity was measured by alternating current impedance measurement.

Experimental Results

Figure 4:
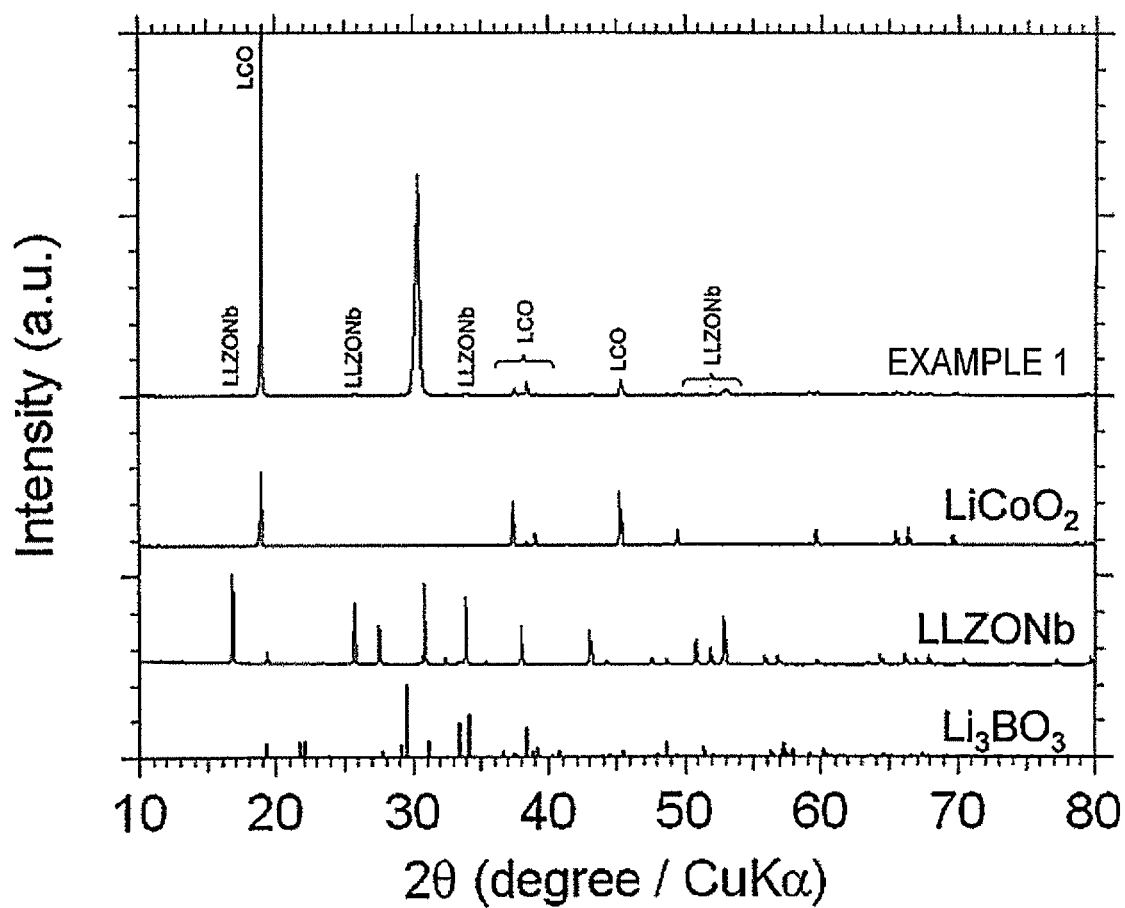
FIG. 4 illustrates an XRD pattern of a composite used in Example 1.

FIG. 4 illustrates an XRD spectrum of the composite of Example 1. In FIG. 4, peaks assigned to $LiCoO_2$ (positive-electrode active material), $Li_3BO_3$ (matrix), LLZONb (solid electrolyte) were observed in the sample. The results demonstrated that in $Li_3BO_3$, $LiCoO_2$, and LLZONb, a chemical reaction, the formation of a third phase, degradation, and so forth did not occur.

Figure 5:
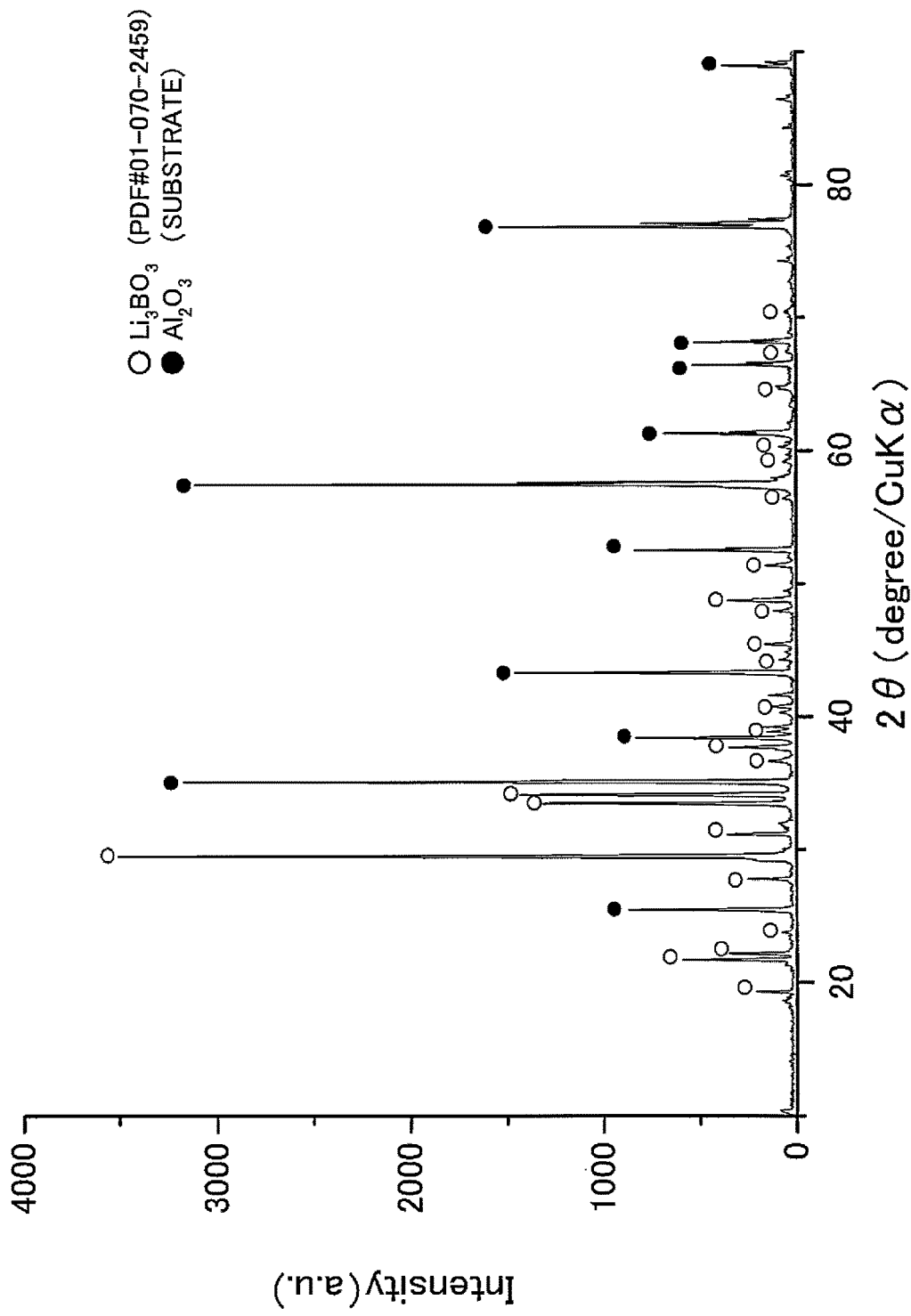
FIG. 5 illustrates an XRD pattern of a composite in Reference Example 4.

FIG. 5 illustrates an XRD pattern of the composite of Reference Example 4. In the XRD pattern, peaks assigned to $Li_3BO_3$ and $Al_2O_3$ used as a substrate were observed. This demonstrated that even if $Al_2O_3$ was used as a substrate, in $Li_3BO_3$ and $Al_2O_3$, a chemical reaction, the formation of a third phase, degradation, and so forth did not occur. In the composite of Example 1, large peaks assigned to $LiCoO_2$ and LLZONb were observed, and peaks assigned to $Li_3BO_3$ were difficult to identify. In the composite of Reference Example 4, the composite being produced in the same firing conditions as in Example 1, peaks assigned to $Li_3BO_3$ were clearly observed. It is thus presumed that similarly to Reference Example 4, $Li_3BO_3$ was also formed in the composite of Example 1.

Figure 6:
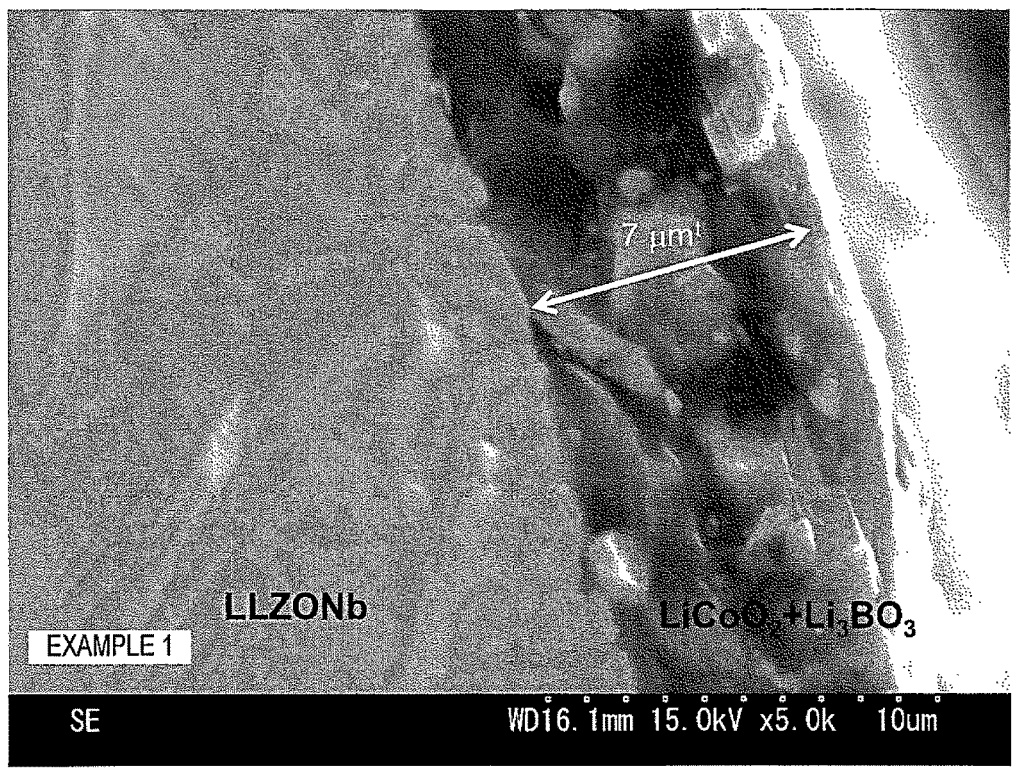
FIG. 6 is a cross-sectional SEM photograph of a composite used in Example 1.
Figure 7:
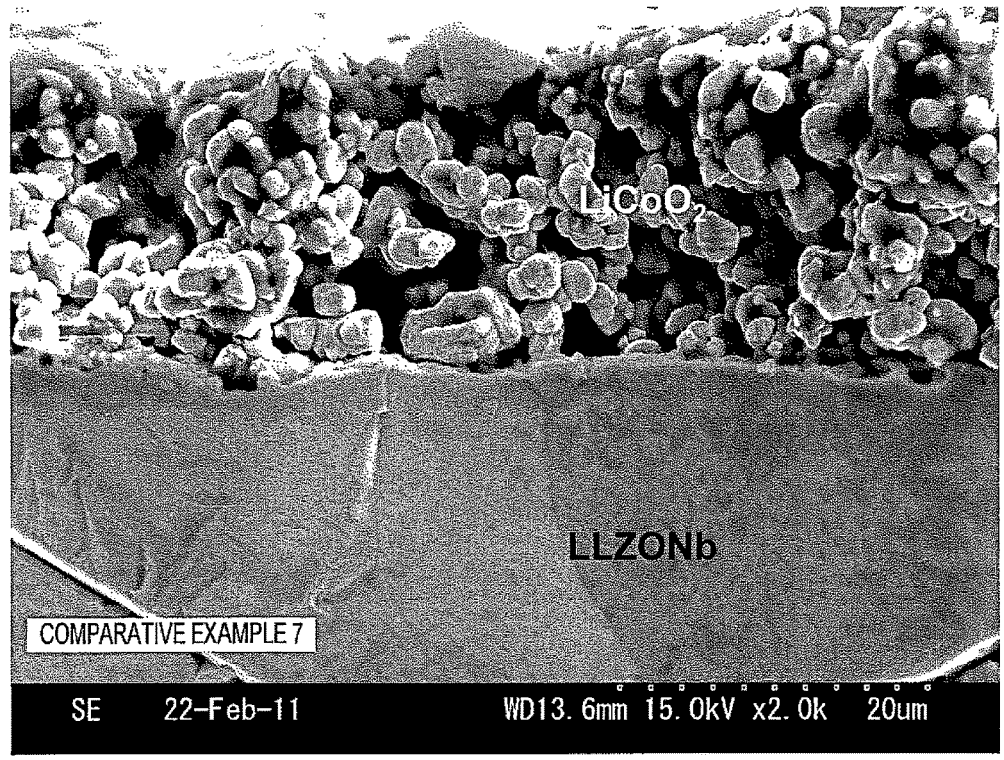
FIG. 7 is a cross-sectional SEM photograph of a composite used in Reference Example 7.

FIG. 6 is a cross-sectional SEM photograph (secondary electron image) of the composite of Example 1. As can be seen in FIG. 6, with respect to the interface between the mixed layer ($LiCoO_2$—$Li_3BO_3$)/solid electrolyte (LLZONb), the mixed layer and the solid electrolyte form two-dimensionally or three-dimensionally bonded interface and are in close contact (not point contact) with each other. Furthermore, a chemical reaction or significant elemental diffusion did not occur at the interface during the production. By way of comparison, a cross section of the composite of Comparative Example 7 was observed with a SEM, the composite being produced by applying a flux-free $LiCoO_2$ paste to a LLZONb pellet and baking the paste under the same conditions as in Example 1. FIG. 7 is a cross-sectional SEM photograph of the composite of Comparative Example 7. The results demonstrated that in the composite of Comparative Example 7, $LiCoO_2$ was deposited on LLZONb in the form of particles and that they were in point contact with each other at the bonded interface.

Figure 8:
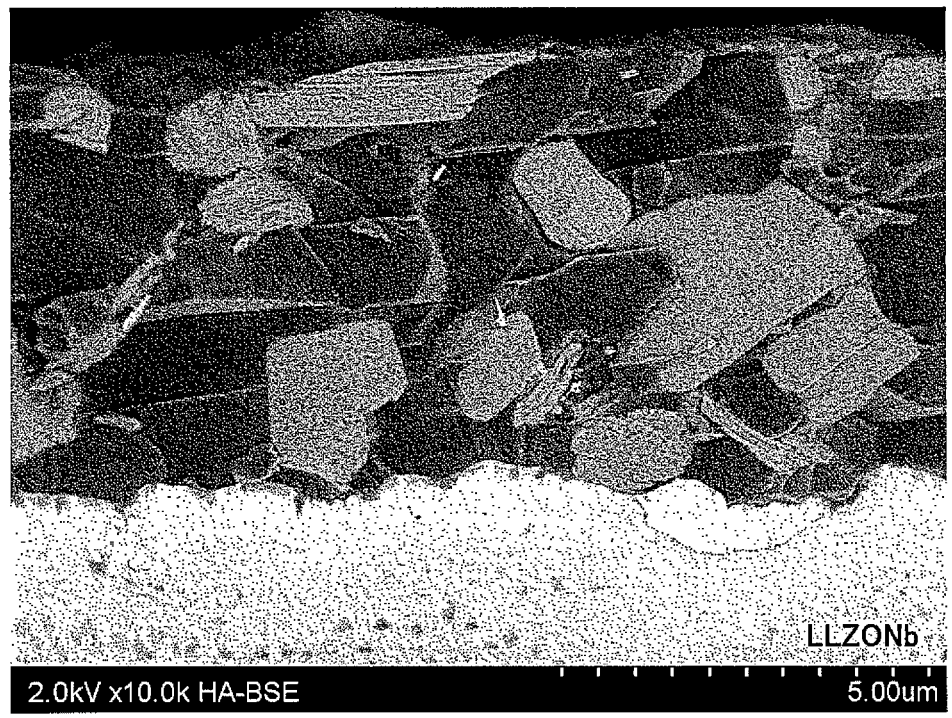
FIG. 8 is a cross-sectional SEM photograph (backscattered electron image) of a composite used in Example 1.
Figure 8:
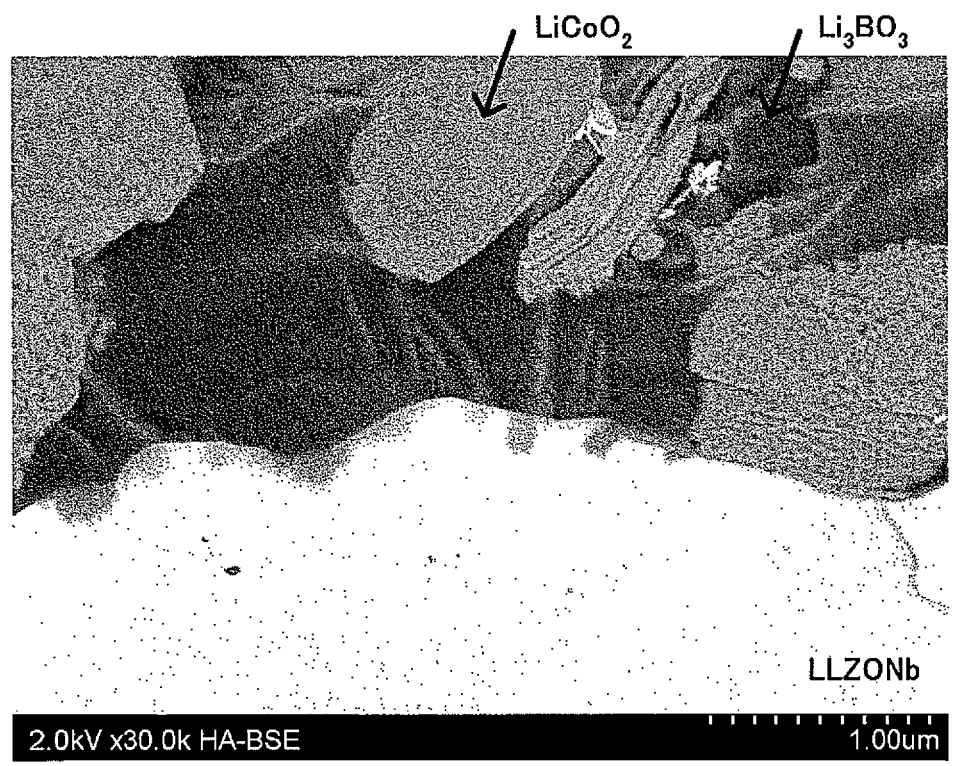

FIG. 8 is a cross-sectional SEM photograph (backscattered electron image) of the composite of Example 1. FIG. 8(a) is a photograph at a low magnification. FIG. 8(b) is a photograph at a high magnification. Commonly, in backscattered electron images, heavy elements are seen in white, and light elements are seen in black. Thus, LLZONb containing La and Zr, which are heavy elements, exhibits the highest whiteness. $LiCoO_2$ whose heavy element is Co alone exhibits the highest whiteness next to that of LLZONb. $Li_3BO_3$ consisting of only light elements exhibits the highest blackness. The results demonstrated that in the composite of Example 1, particles of $LiCoO_2$, which served as the positive-electrode active material, were dispersed in $Li_3BO_3$, which served as the matrix.

Figure 9:
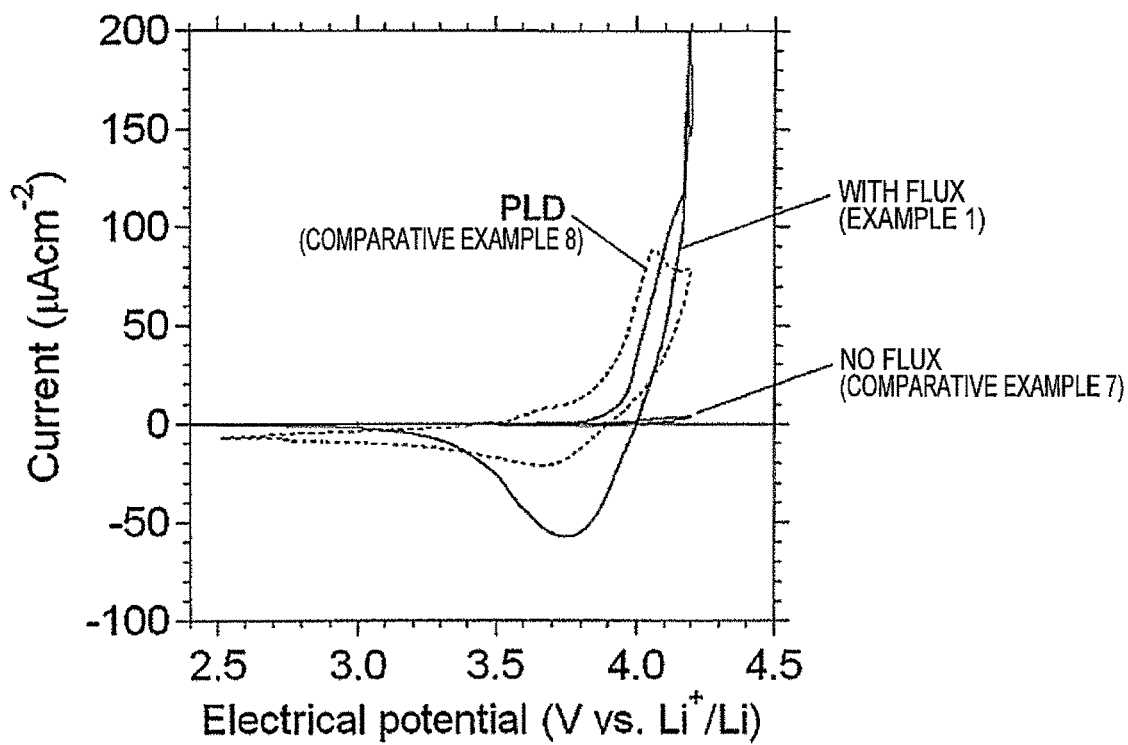
FIG. 9 illustrates the results of constant-voltage charge-discharge measurement of batteries in Example 1 and Comparative Examples 7 and 8.

FIG. 9 illustrates the results of constant-voltage charge and discharge of the batteries in Example 1 and Comparative Examples 7 and 8. The results demonstrated that the battery of Example 1, which included the matrix, had battery characteristics comparable to those of the battery of Comparative Example 8 produced by the PLD method. The battery of the Comparative Example 7, which did not include a matrix, had poor charge-discharge characteristics. A possible reason for this is as follows: The matrix-free $LiCoO_2$ layer is an aggregate of particles. Thus, the contact between $LiCoO_2$ and LLZONb and between the particles of $LiCoO_2$ is point contact. Therefore, lithium-ion-conducting paths are not sufficiently formed, thereby failing to provide sufficient charge-discharge characteristics.

Figure 10:
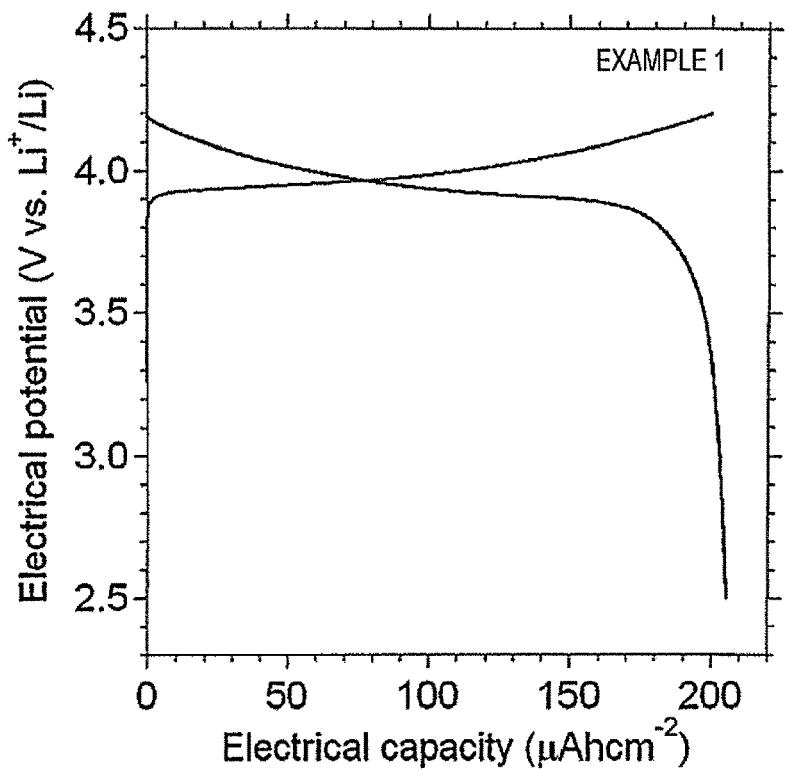
FIG. 10 illustrates the results of constant-current charge-discharge measurement (per unit area) of the battery of Example 1.
Figure 11:
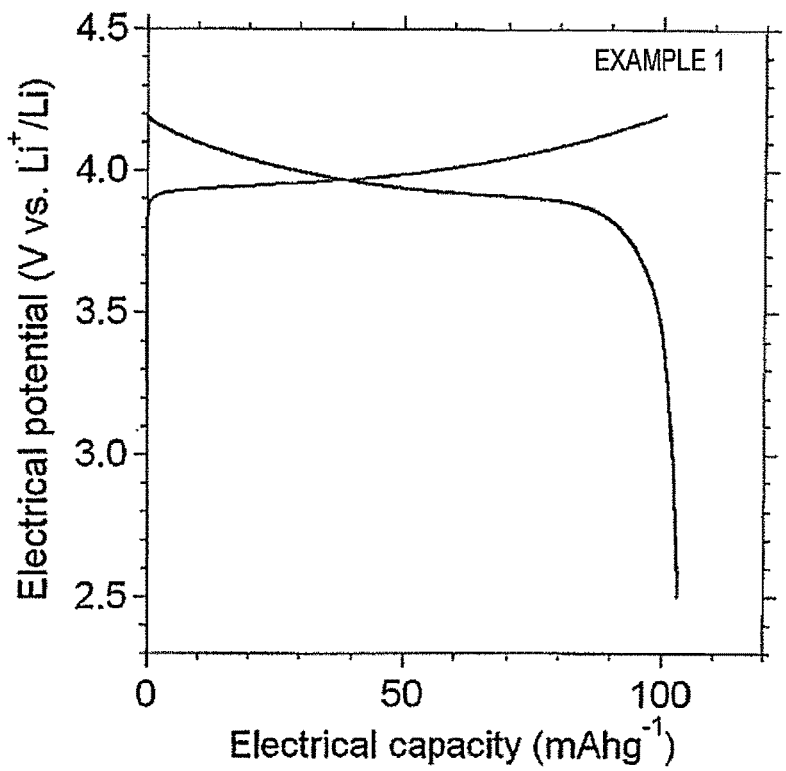
FIG. 11 illustrates the results of constant-current charge-discharge measurement (per unit weight) of the battery of Example 1.

FIGS. 10 and 11 illustrate the results of constant-current charge-discharge measurement of the battery of Example 1. The capacity per unit area of the positive electrode of the battery of Example 1 was about 212 $\mu Ahcm^{-2}$ (FIG. 10). The capacity per unit weight of the positive electrode active material was 103 $mAhg^{-1}$ (FIG. 11). The theoretical capacity of $LiCoO_2$ is 136 $mAhg^{-1}$ (on the assumption that 0.5 mol of Li is eliminated at 4.2 V (vs. $Li^+/Li$) with respect to $CoO_2$ layers). In Example 1, the proportion of the active material used was found to be about 75%.

Figure 12:
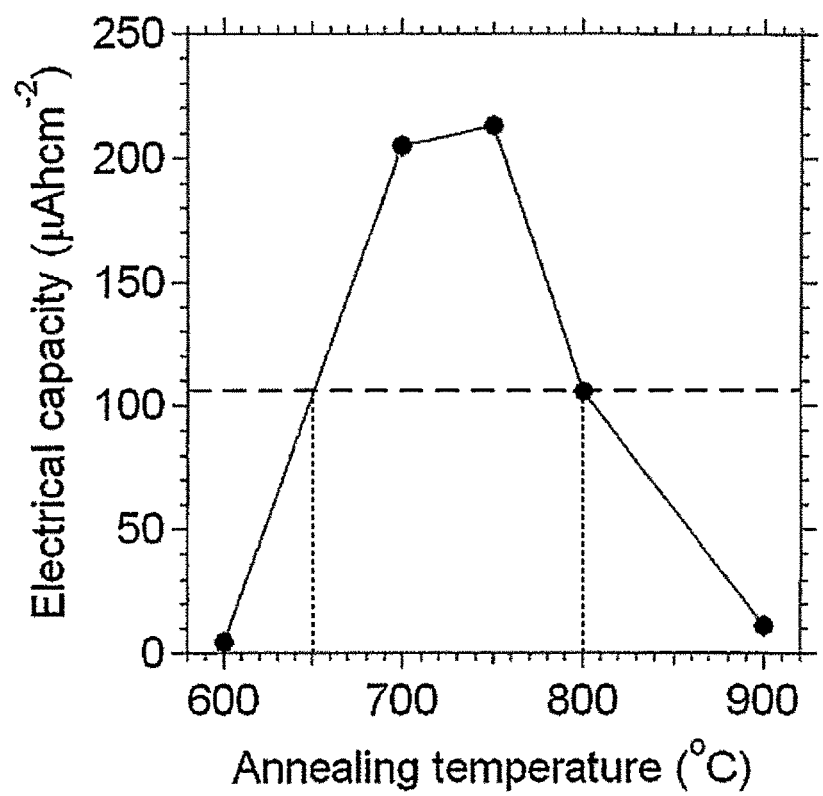
FIG. 12 is a graph illustrating the dependence of the capacity of a battery on treatment temperature.

FIG. 12 is a graph illustrating the relationship between the annealing temperature and the battery capacity. FIG. 12 is formed on the basis of the experimental results of Examples 1 to 3 and Comparative Examples 3 and 5. It was found from FIG. 12 that the annealing temperature was preferably more than 600° C. and 900° C. or lower, more preferably 650° C. or higher and 800° C. or lower, and still more preferably 700° C. or higher and 750° C. or lower. A possible reason why the battery capacity was low at 650° C. or lower is as follows: To allow the battery of the present invention to operate, it is important that the flux should have passed through a liquid phase. The flux ($Li_3BO_3$) used here had a melting point of about 650° C. It was thus presumed that the flux was not sufficiently formed into a liquid phase at the melting point or lower and that lithium-ion-conducting paths were not formed between $LiCoO_2$ particles and between $LiCoO_2$ and LLZONb. Meanwhile, when the temperature is 900° C., a chemical reaction between $LiCoO_2$ and LLZONb seems to occur. It is thus presumed that $LiCoO_2$ was decomposed and that a high-resistance third phase was formed by, for example, the migration of lithium ions at the interface. As a result, the battery capacity was presumed to be reduced.

Table 1 describes the experimental results of Examples 1 to 5 and Comparative Examples 1 to 8 (bondability, discharge capacity). Table 2 describes the experimental results of Reference Examples 1 to 3 (bondability). Table 3 describes the experimental results of Reference Example 5 (lithium-ion conductivity). The results demonstrated that the flux preferably contained boron (B). Although boron was contained, it was impossible to perform charge and discharge in Comparative Example 2, in which $B_2O_3$ was used, and Comparative Example 3, in which $Li_2B_4O_7$ was used. XRD measurement of the composite of Comparative Example 2 revealed the formation of a Li—B—O-based compound. Hence, the flux seemed to eliminate lithium from the positive-electrode active material and the solid electrolyte. It was thus found that the flux is required to be less likely to cause such a reaction. Among the Examples, in Example 4, in which the heating temperature was 900° C., $LiCoBO_3$ was formed at the bonded interface. The results demonstrated that the flux presumably reacted with the positive-electrode active material to reduce the charge-discharge characteristics and that the heating temperature was preferably set to a temperature at which the flux does not react with the positive-electrode active material or the solid electrolyte. In Reference Example 1, although LLZONb was used in place of $LiCoO_2$, when the composite was subjected to XRD measurement, a heterogeneous phase was not observed. From the results, it is presumed that Li in $LiCoBO_3$ formed at the bonded interface of Example 4 originated from $LiCoO_2$. Also in Comparative Example 1, in which $Li_3BO_3$, which was the same flux as that in the Examples, was used, the mixed layer was not in close contact with the solid electrolyte. This is presumably because the flux was not sufficiently melted. The results demonstrated that the heating temperature is required to be a temperature equal to or higher than the melting point of the flux. In Comparative Example 4, in which $Bi_2O_3$ was used, and Comparative Example 5, in which $WO_3$ was used, it was impossible to perform bonding. In Comparative Example 6, in which $Li_2WO_4$ was used and heating was performed at 950° C., although it was possible to perform bonding, the charge-discharge capacity was very low. The foregoing results demonstrated that the selection of the type of flux and the heating temperature significantly affects the battery characteristics. $Li_3BO_3$ has lithium-ion conductivity. It was presumed that a reduction in the lithium-ion conductivity between the positive-electrode active material and the solid electrolyte can be further inhibited.

the results equivalent or superior to those in Example 1 were obtained in the charge-discharge test. This demonstrated that the flux is not limited to $Li_3BO_3$ and that Li and B may be partially replaced with other elements. Specifically, Example 1, in which $Li_3BO_3$ was used as the flux, and Example 5, in which $Li_{2.358}Al_{0.214}BO_2$ was used as the flux, were comparable in bondability and discharge capacity. The results demonstrated that even if Li and B were partially replaced with Al, a satisfactory bonding state was provided, increasing the discharge capacity. As described in Table 3, the lithium-ion conductivity of $Li_{2.358}Al_{0.214}BO_3$ was higher than that of $Li_3BO_3$. This revealed that the partial replacement of Li and B with Al enables the lithium-ion conductivity to increase. Meanwhile, in an all-solid-state lithium secondary battery, it is known that higher lithium-ion con-

TABLE 1

| | FLUX | BAKING TEMPERATURE (° C.) | 1) BONDA-BILITY | DISCHARGE CAPACITY ($\mu Ahcm^{-2}$) | OTHER REMARKS |
|---|---|---|---|---|---|
| EXAMPLE 1 | $Li_3BO_3$ | 750 | ○ | 212 | — |
| EXAMPLE 2 | $Li_3BO_3$ | 700 | ○ | 208 | — |
| EXAMPLE 3 | $Li_3BO_3$ | 800 | ○ | 107 | — |
| EXAMPLE 4 | $Li_3BO_3$ | 900 | ○ | 11 | FORMATION OF $LiCoBO_3$ AT INTERFACE |
| EXAMPLE 5 | $Li_{2.358}Al_{0.214}BO_3$ | 750 | ○ | 205 | — |
| COMPARATIVE EXAMPLE 1 | $Li_3BO_3$ | 600 | Δ | 3 | — |
| COMPARATIVE EXAMPLE 2 | $B_2O_3$ | 900 | ○ | ≤1 | FORMATION OF Li—B—O-BASED COMPOUND |
| COMPARATIVE EXAMPLE 3 | $Li_2B_4O_7$ | 900 | ○ | ≤1 | — |
| COMPARATIVE EXAMPLE 4 | $Bi_2O_3$ | 900 | x | NOT CONDUCTED | DEGRATION OF LLZONb NEAR SURFACE |
| COMPARATIVE EXAMPLE 5 | $WO_3$ | 900 | x | 0 | NO REACTION OCCURED |
| COMPARATIVE EXAMPLE 6 | $Li_2WO_4$ | 950 | Δ | 3 | CAPACITY WAS EQUAL OR LESS THAN THAT OF SAMPLE WITHOUT FLUX |
| COMPARATIVE EXAMPLE 7 | NO FLUX | 850 | Δ | 1 | — |
| COMPARATIVE EXAMPLE 8 | GAS PHASE METHOD (WITHOUT FLUX) | | ○ | 200 | — |

1) ○: BONDING POSSIBLE (CLOSE CONTACT) Δ: BONDING POSSIBLE (POINT CONTACT) x: BONDING IMPOSSIBLE

TABLE 2

| | FLUX | BAKING TEMPERATURE (° C.) | 1) BONDA-BILITY |
|---|---|---|---|
| REFERENCE EXAMPLE 1 | $Li_3BO_3$ | 900 | ○ |
| REFERENCE EXAMPLE 2 | $Li_2WO_4$ | 850 | x |
| REFERENCE EXAMPLE 3 | $Li_2MoO_4$ | 750 | x |

1) ○: BONDING POSSIBLE (CLOSE CONTACT) x: BONDING IMPOSSIBLE

TABLE 3

| MATERIAL | LITHIUM-ION CONDUCTIVITY AT ROOM TEMPERATURE (S/cm) |
|---|---|
| $Li_7La_3Zr_2O_{12}$ | $2.0 \times 10^{-4}$ |
| $Li_{6.75}La_3Zr_{1.75}Nb_{0.25}O_{12}$ | $8.0 \times 10^{-4}$ |
| $Li_5La_3Nb_2O_{12}$ | $6.0 \times 10^{-5}$ |
| LiPON | $2.0 \times 10^{-6}$ |
| $Li_3PO_4$ | $1.0 \times 10^{-7}$ |
| $Li_2CO_3$ | $<10^{-9}$ |
| $Li_3BO_3$ | $8.0 \times 10^{-8}$ |
| $Li_{2.358}Al_{0.214}BO_3$ | $5.6 \times 10^{-6}$ |

In the case where a compound in which Li and B in $Li_3BO_3$ were partially replaced with Al and Si was used as the flux and where a battery was produced as in Example 1, ductivity of materials constituting the positive electrode, the negative electrode, and the solid electrolyte results in better output characteristics. Thus, the partial replacement of Li and B with Al was presumed to improve the output characteristics. Furthermore, the partial replacement of Li and B with, for example, C, Si, Ga, Ge, In, or Sn was presumed to provide the same effect as Al because for example, the coordination number, the ionic radius, and the valence thereof are close to those of Al.

The present application claims priority from the Japanese Patent Application No. 2011-136509 filed on Jun. 20, 2011, the entire contents of which are incorporated herein by reference.

INDUSTRIAL APPLICABILITY

The present invention is applicable to a lithium-ion secondary battery.

EXPLANATION OF REFERENCES

A solid electrolyte layer 10, an electrode 11, a positive electrode 12, a mixed layer 12a, a collector 12b, a negative electrode 14, a negative-electrode active-material layer 14a, a collector 14b, a polymer electrolyte layer 16, and all-solid-state lithium secondary battery 20.

The invention claimed is:

1. An all-solid-state lithium secondary battery comprising:
    a positive electrode containing a positive-electrode active material;
    a negative electrode containing a negative-electrode active material;
    a solid electrolyte arranged between the positive electrode and the negative electrode, the solid electrolyte conducting lithium ions; and
    a mixed layer that is in close contact with a surface of the solid electrolyte adjacent to the positive electrode, the mixed layer containing the positive-electrode active material dispersed in $(Li_{x(1-\alpha)}, M_{x\alpha/\beta})^{\gamma+}(B_{1-y}, A_y)^{z+}O^{2-}{}_\delta$, which serves as a matrix
    where in the formula $(Li_{x(1-\alpha)}, M_{x\alpha/\beta})^{\gamma+}(B_{1-y}, A_y)^{z+}O^{2-}{}_\delta$:
        M and A each represent at least one or more elements selected from C, Al, Si, Ga, Ge, In, and Sn,
        $\alpha$ satisfies $0 \leq \alpha < 1$,
        $\beta$ represents the valence of M,
        $\gamma$ represents the average valence of $(Li_{x(1-\alpha)}, M_{x\alpha/\beta})$,
        y satisfies $0 \leq y < 1$,
        z represents the average valence of $(B_{1-y}, A_y)$, and
        x, $\alpha$, $\beta$, $\gamma$, z, and $\delta$ satisfy the relational expression $(x(1-\alpha)+x\alpha/\beta)\gamma+z=2\delta$; wherein
    the mixed layer is prepared by melting and then solidifying the matrix such that particles of the positive-electrode active material are dispersed in the matrix.

2. The all-solid-state lithium secondary battery according to claim 1, wherein when the positive-electrode active material and the solid electrolyte are subjected to XRD measurement with CuK$\alpha$ radiation, neither peak assigned to a reaction product of the positive-electrode active material and the matrix nor peak assigned to a reaction product of the solid electrolyte and the matrix is observed.

3. The all-solid-state lithium secondary battery according to claim 1, wherein the solid electrolyte is composed of a garnet-type oxide represented by the general formula $Li_{5+x}La_3Zr_xA_{2-x}O_{12}$
    where in the general formula $Li_{5+x}La_3Zr_xA_{2-x}O_{12}$:
        A represents one or more elements selected from the group consisting of Sc, Ti, V, Y, Nb, Hf, Ta, Al, Si, Ga, and Ge, and
        x satisfies $1.4 \leq x < 2$.

4. The all-solid-state lithium secondary battery according to claim 1, wherein the matrix is composed of $(Li_{x(1-\alpha)}, M_{x\alpha/\beta})^{\gamma+}B^{3+}O^{2-}{}_\delta$.

5. The all-solid-state lithium secondary battery according to claim 1, wherein the matrix is composed of $(Li^+_x(B_{1-y}, A_y)^{z+}O^{2-}{}_\delta$.

6. The all-solid-state lithium secondary battery according to claim 1, wherein the matrix is composed of $Li_3BO_3$.

* * * * *